United States Patent [19]

Rhee

[11] Patent Number: 5,447,097
[45] Date of Patent: Sep. 5, 1995

[54] DISPOSABLE LINER FOR A COOKING GRILL

[76] Inventor: Kyung T. Rhee, 44 Paag Cir., Little Silver, N.J. 07739

[21] Appl. No.: 260,101

[22] Filed: Jun. 15, 1994

[51] Int. Cl.⁶ .............................................. A47J 27/00
[52] U.S. Cl. ........................................ 99/450; 99/444
[58] Field of Search ................... 99/450, 445, 444; 126/25 R, 9 R; 72/180, 379.2

[56] References Cited

U.S. PATENT DOCUMENTS

| | | | |
|---|---|---|---|
| D. 120,782 | 3/1940 | May | D7/359 |
| D. 311,339 | 10/1990 | Weed | D7/359 |
| D. 318,235 | 7/1991 | Weed | D7/359 |
| 1,819,660 | 8/1931 | Stone | D7/359 |
| 1,899,682 | 2/1933 | Goldenberg | 99/445 |
| 1,979,902 | 11/1934 | Potter et al. | D7/359 |
| 2,908,214 | 10/1959 | Persinger | 99/445 |
| 3,470,572 | 10/1969 | Wasserman . | |
| 3,509,814 | 5/1970 | Karapetian | 99/445 |
| 3,601,280 | 8/1971 | Mills | 99/444 |
| 3,717,083 | 2/1973 | Karapetian | 99/445 |
| 4,596,729 | 6/1986 | Morrison | 428/137 |
| 4,673,425 | 6/1987 | Hirs | 55/435 |
| 4,835,034 | 5/1989 | Cruz | 428/131 |
| 4,955,362 | 9/1990 | Underdown | 126/540 |
| 4,979,440 | 12/1990 | Latour et al. | 99/445 |
| 5,009,151 | 4/1991 | Hungerford | 99/445 |
| 5,259,299 | 11/1993 | Ferraro | 99/445 |

*Primary Examiner*—David A. Scherbel
*Assistant Examiner*—Reginald L. Alexander
*Attorney, Agent, or Firm*—Plevy & Associates

[57] ABSTRACT

A liner used to line the grills of barbecues and other types of cooking grill structures. The liner is shaped in a sinusoidal pattern that fits over the parallel rods on the grill. Apertures are formed in the troughs of the sinusoidal pattern. The apertures enable heat and hot gases from the below lying flame to directly contact food placed on the liner. Additionally, the apertures drain drippings, barbecue sauce and the like that flows from the food and gathers in the troughs. The presence of the apertures in the troughs define reliefs that enable the liner to pass over the parallel bars of a grill despite the presence of cross bars that lay perpendicular to the parallel bars.

16 Claims, 4 Drawing Sheets

DISPOSABLE LINER FOR A COOKING GRILL

BACKGROUND OF THE INVENTION

1. Field of the Invention

The present invention relates to sanitary protective liners for cooking grills, such as barbecue grills and the like. More particularly, the present invention relates to liners made of foil that conform to the bar structure of the grill and are perforated to enable the free flow of gas and material across the plane of the grill.

2. Prior Art Statement

When cooking upon a grill over an open flame or coals, the bars of the grill become covered with the burnt drippings of the food being cooked and carbon deposits from the below lying flame. Accordingly, the grill must be periodically cleaned. This required maintenance is time consuming, dirty work which discourages people from cooking upon grills.

Cooking upon a grill has many well known benefits. For instance, cooking on a grill adds a smoked flavor to the prepared food and cooking on a grill produces food with less fat content than if the food were fried. Such benefits are typically lost when many traditional liners are placed over a grill. For example, one of the most common types of liners traditionally used to cover grills is aluminum foil. The reason why aluminum foil is so commonly used is because it is easy to place on a grill of any size and easy to remove. However, the aluminum foil is solid, thereby preventing both gases from raising through the grill and fatty drippings from flowing away from the food. As is exemplified by U.S. Pat. No. 3,470,572 to Wassermann, entitled TOOL FOR APPLYING A PROTECTIVE FOIL TO THE INDIVIDUAL RODS OF A BARBECUE GRILL, devices have been created in the prior an that cut aluminum foil into small pieces shaped to cover only the rod structures of a grill. Such devices are useful, but the application and removal of aluminum foil applied in such a manner is still highly time consuming and labor intensive.

To avoid the time and labor involved in applying foil to the individual rods of a grill, a person may use a performed perforated structure such as a broiling pan grid, wherein the broiling grid can be placed directly over the grill. Such broiling grids are commonplace in the kitchen and are exemplified by U.S. Pat. No. 1,819,660 to Stone, entitled BROILING DEVICE. The problem with such devices is that they rarely match the exact size of the below lying grill. As such, the cooking surface is typically reduced. Additionally, many such broiling grids are not disposable and must be cleaned, thereby defeating the original purpose of the grill cover.

Disposable liners have been invented for various items such as paint trays, baking dishes and the like. Such a liner is exemplified by U.S. Pat. No. 4,673,425 to Hirs, entitled DISPOSABLE LINER FOR PAINT BOOTH GRATING. The disadvantages of such liners is that they are configured to fit over a specifically shaped structure and cannot be applied to a structure of a different shape. Accordingly, such liners are not adaptable for use over cooking grills such as those found in barbecues since barbecue grills are manufactured in a large number of shapes and styles. As such, barbecue grills have different bar sizes, different size spaces between bars, different cross bar configurations, and different surface areas.

A need, therefore, exists in the an for a disposable liner that can be placed over a grill despite the configuration of the grill. The need also exists for a grill liner that can fit over a large variety of grills and enables the free flow of gases and liquids in between the food on top of the grill and the flame below the grill.

A need also exists for a liner that acts as a sanitary barrier in between the food being cooked and the below lying grill, thereby preventing the food being cooked from becoming contaminated with carbon deposits and other debris present on the grill.

SUMMARY

The present invention is a liner used to line the grills of barbecues and other types of cooking grill structures. The liner is shaped in a sinusoidal pattern that fits over the parallel rods on the grill. Apertures are formed in the troughs of the sinusoidal pattern. The apertures enable heat and hot gases from the below lying flame to directly contact food placed on the liner. Additionally, the apertures drain drippings, barbecue sauce and the like that flows from the food and gathers in the troughs. The presence of the apertures in the troughs define reliefs that enable the liner to pass over the parallel bars of a grill despite the presence of cross bars that lay perpendicular to the parallel bars.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE PRESENT INVENTION

Although the present invention can be used in many different applications where a grid structure is to be lined, such as an oven rack or the like, the present invention is especially suitable for use in lining the grills within a barbecue. Accordingly, the present invention will be described in connection with a barbecue application to thereby set forth the best known mode of the invention.

Figure 1:
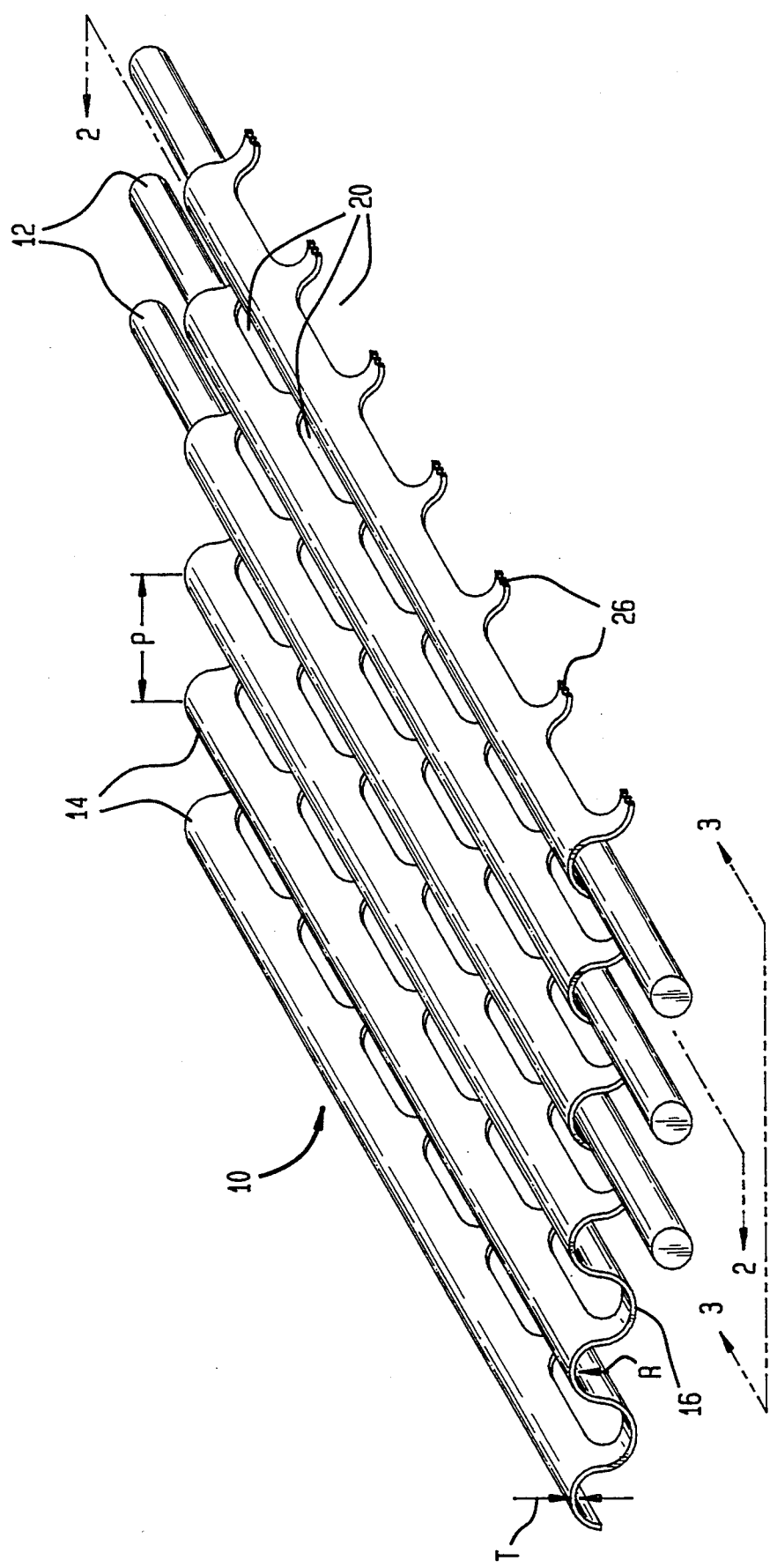
FIG. 1 is a perspective view of one preferred embodiment of the present invention liner shown in conjunction with rods from a barbecue grill to facilitate further consideration and discussion.

Referring to FIG. 1, the present invention liner 10 is shown positioned over the parallel bars 12 of a traditional barbecue grill. The liner 10 is preferably made of aluminum having a gauge thickness T of between 0.05 mm and 0.3 mm. The aluminum is stamped onto a sinusoidal configuration having rows of parallel crests 14 interposed between rows of parallel troughs 16. The pitch P in between subsequent crests 14 is preferably between 6.4 mm and 25.4 mm. However, smaller or larger pitch sizes may be used. The radius R of the curve forming each crest 14 is preferably between 5.1 mm and 10.2 mm so as to accommodate the radius of most traditional barbecue grill bars 12. The gauge thickness of the liner 10 is thin enough to enable the liner 10 to be easily deformed by hand. Accordingly, if the pitch P of the sinusoidal configuration does not match the spacing of the bars 12 on the barbecue grill, the liner 10 can be manually stretched or compressed, thereby changing the pitch P until the pitch P matches the spacing on the barbecue grill.

Figure 2:
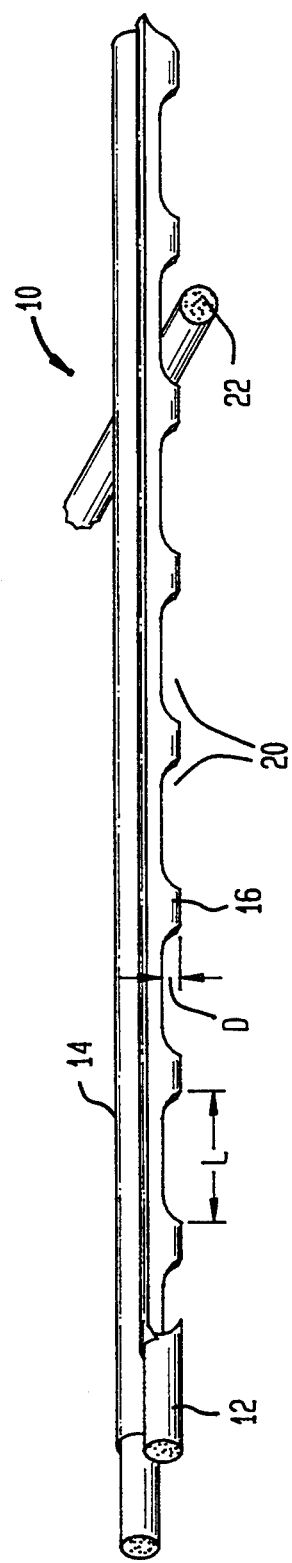
FIG. 2 is a cross-sectional perspective view of the embodiment of FIG. 1, viewed along section line 2—2.

Referring to FIG. 2 in conjunction with FIG. 1, it can be seen that large apertures 20 are formed through the liner 10 within the troughs 16. The presence of the apertures 20 enable the heat and hot gases produced by the flame of the barbecue to directly engage any food being cooked upon the liner 10. Similarly, any drippings, barbecue sauce or like material that flows off of the food flows into the troughs 16 and down through the apertures 20 onto the below lying flame.

Figure 4:
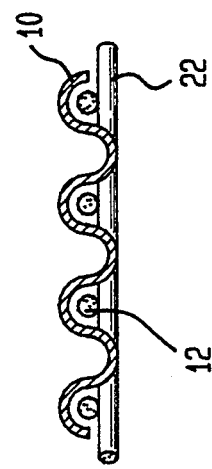
FIG. 4 is a side view of an alternate embodiment of the present invention, viewed along line 3—3 as indicated in FIG. 1.
Figure 3:
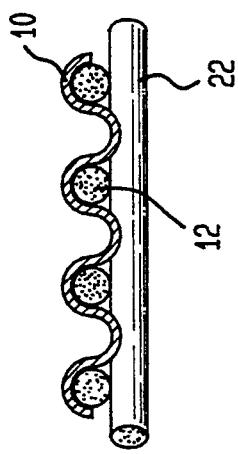
FIG. 3 is a side view of one embodiment of the present invention, viewed along line 3—3 as indicated in FIG. 1.

Although the shown embodiment illustrates oblong apertures 20, it should be understood that round apertures or any other geometrical shape may be used. Shapes with rounded corners are preferred over shapes with sharp corners to help prevent the liner 10 from tearing should the liner 10 be stretched when applied to the barbecue grill. Despite the geometrical configuration of the apertures 20, it is preferred that the depth D of each aperture 20 extend from the base of each trough 16 to a point midway in between the low point of the trough 16 and the high point of the crest 14. The apertures 20 in each of the troughs 16 align with one another in straight rows that travel perpendicular to the direction of the grill bars 12. Accordingly, if the barbecue grill contains cross bars 22 (FIG. 2) that travel perpendicular to the grill bars 12, these cross bars 22 pass into the reliefs defined by the apertures 20 as the liner 10 is placed over the barbecue grill. The reliefs defined by the apertures 20 have a length L which is preferably at least three times as long as the diameter of the cross bar 22. Accordingly, the liner 10 can fit over a large variety of grill structures with differing cross bar spacing configurations. Referring to FIG. 3, it can be seen that when the grill bars 12 have a fairly large diameter, only a small portion of the cross bars 22 pass into the reliefs defined by the apertures 20. However, as is shown in FIG. 4, when the grill bars 12 have small diameters, the cross bars 22 may pass completely into the reliefs defined by the apertures 20. It will be understood that the pitch of the sinusoidal pattern on the present invention liner may not always exactly match the bar spacing on the grill. As such, the liner may be first pulled or compressed to come close to the required spacing. The liner can then be presses down against the grill, whereby the liner will conform to the grill bars and provide the configurations shown in either FIG. 3 or FIG. 4.

Returning to FIG. 1, optional perforations 26 may be formed along the bottom of each trough 16 in between each of the apertures 20. The presence of the perforations 26 and apertures 20 at the bottom of each trough 16, creates a weakened line that is easily broken by tearing the liner 10 along the line or bending the liner 10 back and forth across the line. Accordingly, a person can easily cut the liner 10 to size by hand. If the liner 10 is too narrow to cover a particular barbecue grill, multiple segments of liner 10 may be made and placed on the grill in a slightly overlapping fashion, thereby completely covering the barbecue grill despite its size and/or configuration.

Figure 5:
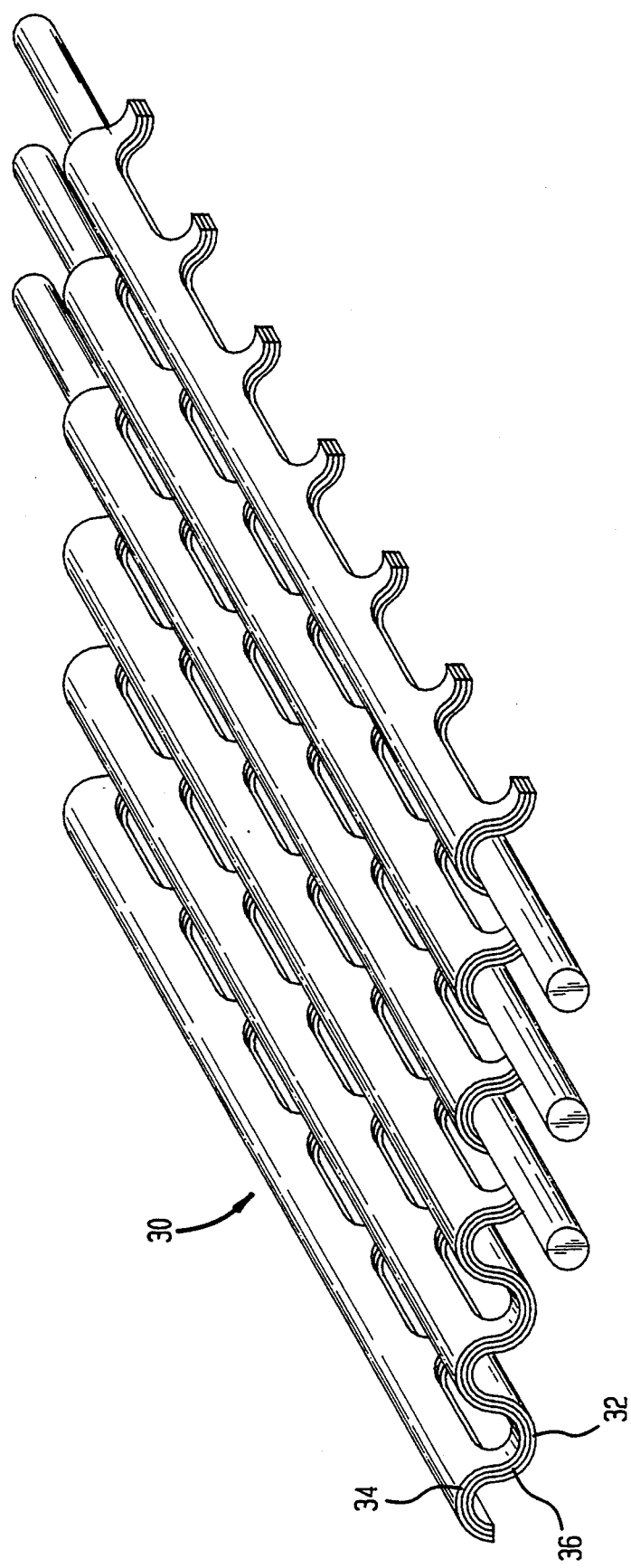
FIG. 5 is a perspective side view of an alternate embodiment of the present invention liner.

Referring to FIG. 5 an alternate embodiment of the present invention is shown wherein the liner 30 is made of a sheet of fire resistant material 32 coated with an appropriate surface material 34 for cooking. At least one intermediate material 36 may be interposed in between the surface material 34 and the base sheet 32 to add strength, flexibility and or improved heat conductivity to the liner 30. The fire resistant material 32 can be a metal foil or metal mesh capable of maintaining a sinusoidal pattern. The surface material is preferably TEFLON, a ceramic material, stainless steel or any other preferred cooking surface. The optional intermediate materials can be metals, ceramics or any other heat resistant material that add a desired strength, heat conductibility and/or flexibility to the liner 30.

To form the liner shown in FIGS. 1-4, a sheet of foil is stamped into a sinusoidal pattern. The apertures and perforations are the punched through the liner in the appropriates locations. To form the liner shown in FIG. 5, the fire resistant material is coated with at least one surface material. The composite is then stamped into the sinusoidal pattern and the apertures and perforations are stamped through the composite.

Figure 6:
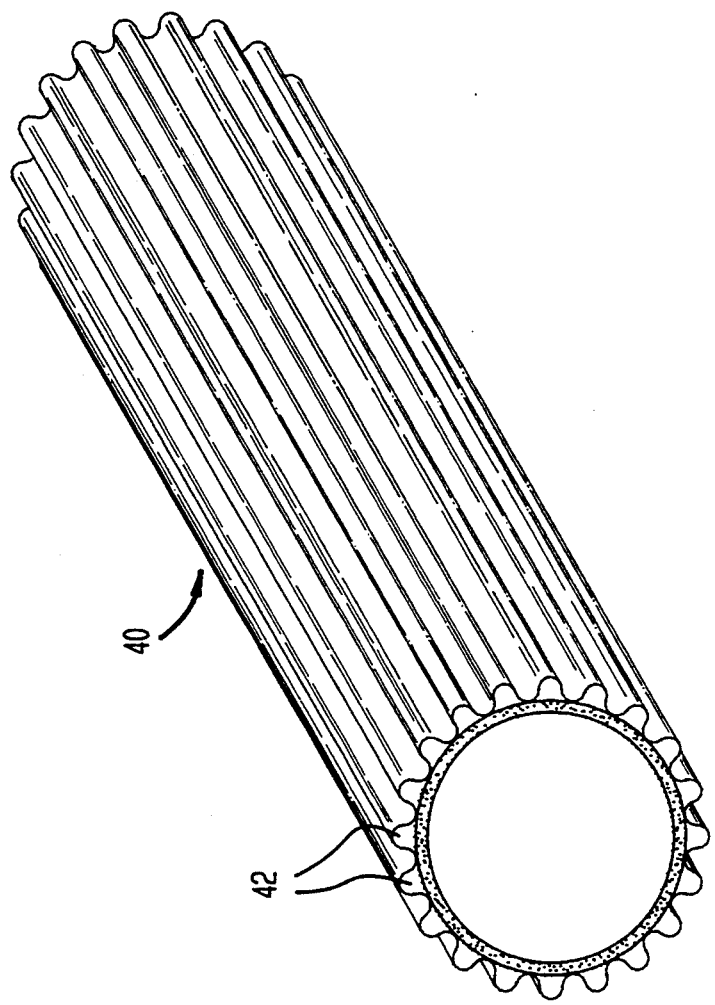
FIG. 6 is a perspective view of a roll used to support the present invention liner.

In FIG. 6 a roll 40 is shown having multiple teeth 42 radially extending from its exterior. The roll 40 may be molded as an integral unit or may be molded plastic member wrapped around a paperboard tube. The teeth 42 on the roll 40 follow the same sinusoidal pattern as is stamped into the liner (FIG. 1). As a result, the liner may be wound around the roll 40, the roll becomes thicker. However, depending upon the diameter of the roll 40 and the thickness of the liner, the liner may be wound several times around the roll 40 before a significant interference in fit occurs. Accordingly, the present invention liner may be sold wound on rolls 40 and contained within a box, much like plain aluminum foil, plastic wrap and wax paper. A user could then unroll a desired length of liner from the roll and remove that section from the remainder on the roll by tearing along the perforated lines as was before explained.

The exemplary embodiments described in conjunction with the figures show the best mode of the invention as contemplated by the inventor. However, another person skilled in the art may make variations and modifications to the described embodiments utilizing functionally equivalent components and alternate configurations. All such variations and modifications are intended to be included within the scope of the present invention as defined by the appended claims.

What is claimed is:

1. A disposable liner for a cooking grill, wherein the cooking grill has a plurality of parallel rods and at least one cross rod that lays perpendicular to the parallel rods, said liner comprising:

a sheet of metal between 0.05 mm and 0.3 mm thick, said sheet of metal being formed into a generally sinusoidal pattern that defines a plurality of parallel troughs and crests, wherein each of said crests is shaped to receive one of the parallel rods therein when said sheet of metal is placed upon the cooking grill; and wherein a plurality of apertures are disposed through said sheet of metal in each of said troughs, each of said apertures defining an opening in said sheet of metal that extends from the base of a trough to a point substantially midway between the trough and an adjacent crest.

2. The liner according to claim 1, further including a plurality of perforations extending between said plurality of apertures in each of said troughs, said plurality of perforations combining with said plurality of apertures to provide a perforated line in each of said troughs that enables said sheet of metal to be readily torn.

3. The liner according to claim 1, wherein said plurality of crests on said sheet of metal are disposed in parallel lines a predetermined distance from one another, whereby the thickness of said sheet of metal enables said predetermined distance to be selective altered as desired by applying a manual tensile force to said sheet of metal to stretch said sheet of metal.

4. The liner according to claim 1, wherein said apertures in each of said troughs are shaped to receive the cross rods of the cooking grill at least partially therein, when the sheet of metal is placed upon the cooking grill.

5. The liner according to claim 1, further including at least one other material coating said sheet of metal.

6. The liner according to claim 5, wherein said at least one other material coating is selected from a group consisting of TEFLON, ceramics and stainless steel.

7. A disposable liner for a barbecue grill, wherein the barbecue grill has a plurality of parallel rods in a common plane joined by at least one cross rod below said common plane, said disposable liner comprising;
a sheet of aluminum shaped in a generally sinusoidal pattern that includes a plurality of troughs and crests, said sheet of aluminum having a plurality of apertures formed therethrough in each of said troughs, each of said apertures defining an opening in said sheet of aluminum that extends from the base of a trough to a point substantially midway between the trough and an adjacent crest, whereby when said sheet of aluminum is placed on the barbecue grill the parallel rods of the grill are received in said crests of the sheet of aluminum and the cross bar of the grill at least partially extends into said apertures in said troughs of said sheet of aluminum.

8. The liner according to claim 7, wherein each of said apertures in adjacent troughs align in a generally straight line.

9. The liner according to claim 7, wherein said sheet of aluminum has a thickness of between 0.05 mm and 0.3 mm.

10. The liner according to claim 7, further including perforations extending between said plurality of apertures in each of said troughs, wherein said perforations combine with said plurality of apertures to provide a perforated line in each of said troughs that enables said sheet of aluminum to be readily torn.

11. A method of manufacturing a liner for a barbecue grill comprising the steps of:
providing a sheet of fire resistant material;
shaping said sheet of into a sinusoidal pattern having repeating troughs and crests;
forming a plurality of apertures in said sheet, wherein said plurality of apertures are disposed in said troughs and each of said apertures defines an opening in said sheet of fire resistant material that extends from the base of a trough to a point substantially midway between the trough and an adjacent crest.

12. The method according to claim 11, wherein said sheet is comprised of multiple layers of dissimilar material.

13. The liner according to claim 7, wherein said plurality of crests on said sheet of aluminum are disposed in parallel lines a predetermined distance from one another, whereby the thickness and configuration of said sheet of aluminum enables said predetermined distance to be selective altered as desired by applying a manual tensile force to said sheet of aluminum to stretch said sheet of aluminum.

14. The liner according to claim 7, further including at least one other material coating said sheet of aluminum.

15. The liner according to claim 14, wherein said at least one other material coating is selected from a group consisting of TEFLON, ceramics and stainless steel.

16. The liner according to claim 7, wherein the cross bar in the barbecue grill has a predetermined diameter and each of said plurality of apertures creates an opening in each of said troughs that is at least as high as the predetermined diameter and is at least three times as long as the predetermined diameter.

* * * * *